United States Patent
Amtmann

(10) Patent No.: US 8,441,342 B2
(45) Date of Patent: May 14, 2013

(54) PSEUDO-RANDOM AUTHENTIFICATION CODE ALTERING SCHEME FOR A TRANSPONDER AND A BASE STATION

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 856 days.

(21) Appl. No.: 12/300,822

(22) PCT Filed: May 4, 2007

(86) PCT No.: PCT/IB2007/051817
§ 371 (c)(1),
(2), (4) Date: Nov. 14, 2008

(87) PCT Pub. No.: WO2007/132420
PCT Pub. Date: Nov. 22, 2007

(65) Prior Publication Data
US 2009/0179743 A1    Jul. 16, 2009

(30) Foreign Application Priority Data
May 15, 2006 (EP) .................................. 06113909

(51) Int. Cl.
*H04Q 5/22*    (2006.01)
(52) U.S. Cl.
USPC ... 340/10.5; 340/5.21; 340/10.51; 340/10.52; 340/572.1; 340/10.1
(58) Field of Classification Search ........................ None
See application file for complete search history.

(56) References Cited

U.S. PATENT DOCUMENTS

| 4,800,590 | A * | 1/1989 | Vaughan ........................ 713/184 |
| 4,850,018 | A * | 7/1989 | Vogt ................................ 705/63 |
| 7,492,258 | B1 * | 2/2009 | Shoarinejad et al. ....... 340/572.1 |
| 2003/0112972 | A1 * | 6/2003 | Hattick et al. ................... 380/46 |
| 2004/0066278 | A1 * | 4/2004 | Hughes et al. ............... 340/10.1 |
| 2004/0246103 | A1 * | 12/2004 | Zukowski ................... 340/10.41 |
| 2005/0068152 | A1 * | 3/2005 | Umehara et al. ............... 340/5.8 |
| 2005/0231328 | A1 * | 10/2005 | Castle et al. .................. 340/10.3 |
| 2006/0208853 | A1 * | 9/2006 | Kung et al. .................. 340/5.61 |
| 2006/0212165 | A1 * | 9/2006 | Watanabe ..................... 700/217 |
| 2006/0255131 | A1 * | 11/2006 | Stewart ......................... 235/383 |
| 2006/0261926 | A1 * | 11/2006 | Zimmerman et al. ....... 340/10.1 |
| 2007/0180009 | A1 * | 8/2007 | Gutnik ........................... 708/250 |
| 2008/0165005 | A1 * | 7/2008 | Burbridge et al. ......... 340/572.1 |
| 2008/0169909 | A1 * | 7/2008 | Park et al. .................... 340/10.4 |

FOREIGN PATENT DOCUMENTS

| WO | 03050757 A1 | 6/2003 |
| WO | 2004034321 A | 4/2004 |

OTHER PUBLICATIONS

EPCglobal, EPC Radio-Frequency Identity Protocols Class-1 Generation-2 UHF RFID Protocol for Communications at 560 MHz-960 MHz Version 1.1.0, Dec. 17, 2005.*

(Continued)

*Primary Examiner* — Benjamin C Lee
*Assistant Examiner* — Curtis King

(57) ABSTRACT

An electric circuit for a transponder (110) for communication with a base station (120), the electric circuit comprising a memory unit (111) adapted for storing communication related information, and a processor unit (112) adapted for altering an authentification code necessary for the base station (120) to get access to the memory (111) in accordance with a pseudo-random authentification code altering scheme.

16 Claims, 2 Drawing Sheets

OTHER PUBLICATIONS

Henrici, D., et al; "Hash-Based Enhancement of Location Privacy for Radio-Frequency Identification Devices Using Varying Identifiers"; Pervasive Computing and Communications Workshops, 2004; IEEE, Mar. 14, 2004; pp. 149-153; XP010689745; ISBN: 0-7695-2106-1.

* cited by examiner

PSEUDO-RANDOM AUTHENTIFICATION CODE ALTERING SCHEME FOR A TRANSPONDER AND A BASE STATION

FIELD OF THE INVENTION

The invention relates to an electric circuit for a transponder for communication with a base station.

Moreover, the invention relates to a transponder for communication with a base station.

Beyond this, the invention relates to a base station.

Furthermore, the invention relates to a method of communicating between a transponder and a base station.

The invention further relates to a program element.

Beyond this, the invention relates to a computer-readable medium.

BACKGROUND OF THE INVENTION

The importance of automatic identification systems increases.

In particular contactless identification systems like transponder systems (for instance using an RFID tag) are suitable for a wireless transmission of data in a fast manner and without cable connections that may be disturbing. Such systems use the emission and absorption of electromagnetic waves, particularly in the high frequency domain.

RFID tags may be protected using a password which is stored unchangeable in a memory of the RFID tag. When a reader/writer desires access to the RFID tag for writing/reading, the reader/writer must send the password to the RFID tag to authenticate itself. However, such a system may be prone to failure, since it does not provide sufficient protection against systems trying to overcome the security barrier of the fixed password on a trial and error strategy.

OBJECT AND SUMMARY OF THE INVENTION

It is an object of the invention to provide a secure communication system.

In order to achieve the object defined above, an electric circuit, a transponder, a base station, a method of communicating between a transponder and a base station, a program element, and a computer-readable medium according to the independent claims are provided.

According to an exemplary embodiment of the invention, an electric circuit for a transponder for communication with a base station is provided, the electric circuit comprising a memory unit adapted for storing communication related information, and a processor unit adapted for altering an authentification code necessary or sufficient for the base station to get access to the memory in accordance with a pseudo-random authentification code altering scheme.

According to another exemplary embodiment of the invention, a transponder for communication with a base station is provided, the transponder comprising an electric circuit having the above mentioned features, and a wireless communication unit electrically coupled to the electric circuit for communication with the base station.

According to still another exemplary embodiment of the invention, a base station is provided being adapted for communication with a transponder comprising an electric circuit having the above mentioned features.

According to yet another exemplary embodiment of the invention, a method of communicating between an electric circuit of a transponder and a base station is provided, the method comprising altering an authentification code necessary or sufficient for the base station to get access to communication related information to be stored in a memory of the electric circuit in accordance with a pseudo-random authentification code altering scheme.

According to still another exemplary embodiment of the invention, a program element is provided, which, when being executed by a processor unit, is adapted to control or carry out a method of communicating between an electric circuit of a transponder and a base station having the above mentioned features.

According to another exemplary embodiment of the invention, a computer-readable medium is provided, in which a computer program is stored which, when being executed by a processor, is adapted to control or carry out a method of communicating between an electric circuit of a transponder and a base station having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The processor unit may repeatedly alter the authentification code in a manner "sufficient" for the base station to get access to the memory in accordance with the pseudo-random authentification code altering scheme. In this context, the term "sufficient" may denote particularly that only the (alterable) authentification code is required to get access to the memory.

The term "pseudo-random" may particularly denote a scheme which allows to unambiguously calculate an altered password based on a present password and a predetermined algorithm. Such a scheme does not allow an entity which does not know the algorithm to derive the new password from the old password in a straightforward manner.

The term "base station" may particularly denote a fixed or stationary transmitter-receiver device that may act as a central point between wireless or wired devices (like transponders), and may allow to read information from and/or to write information in such devices. Such a base station may thus serve as a central control instance to control communication with one or more transponders and may thus serve as a communication partner for a transponder. Such a base station may generate an electromagnetic field which, when a transponder enters this electromagnetic field, may represent the medium for transmission of communication messages between base station and transponder and/or may serve as an energy supply for the powering the transponder.

According to an exemplary embodiment of the invention, a transponder with an overwritable memory portion (i.e. a re-writable memory) may be provided. The password or authentification code which may be stored in such a memory unit (or somewhere else) and being the "key" necessary for an external entity for using the memory for reading and/or writing may be updated from time to time under the control of a control unit or processor unit of the transponder so that it may become more difficult for non-authorized entity to get access to the transponder.

A base station (for instance a read and/or write device) may be configured in accordance with the modifiable password scheme of the transponder so as to allow to get the password updated synchronously with the transponder. By taking this measure, the (authorized) base station may always know which password is presently valid for accessing the memory of the transponder. In order to further complicate unauthorized access, the scheme for updating the password may be a pseudo-random authentification code altering scheme which modifies the password in accordance with a pseudo-random algorithm. Therefore, it may become almost impossible for an entity which does not know this pseudo-random authentification code altering scheme to predict what the password at a particular point of time in the future will be. This may further improve security of the system.

For instance, such a password may be stored in an alterable portion of an RFID (radio frequency identification) tag, particularly in an alterable portion of a memory of an RFID tag. In accordance with the predetermined scheme, for instance after expiry of a predetermined time interval, the password may be modified in accordance with a defined scheme. This scheme may be confidential and therefore unknown to an external device, but known by an authorized base station which may use the password to access the memory (for instance to read, to write or to lock access to the memory).

With the so-called EPC Gen 2 (Generation 2 Electronic Product Code) tag, portions of a memory of an RFID system may be protected using a password so that the memory of the RFID tag can only be read/programmed when the password is known by the reading/writing entity.

In such conventional systems, each RFID tag may have a unique serial number which can only be read and stored in a memory, but a logic unit in the RFID tag may prevent a modification of the fixed password.

In contrast to such a conventional system, embodiments of the invention may provide more flexibility and an improved security, since methods like DPA ("differential power analysis") may allow to determine the password of a conventional RFID tag by trial and error, but not of the transponder according to embodiments of the invention which changes the password frequently. This may improve security in communication with a transponder system according to an exemplary embodiment of the invention.

According to an exemplary embodiment of the invention, critical portions of a transponder may be protected, for instance to accessibility of serial numbers may be protected with a password. Additional measures may be taken in order to make it more difficult for unauthorized entities to access the portion to be protected. The password does not necessarily have to be stored in the memory, which may save chip area and therefore costs, but the password may be selected "on the fly" in a random manner by the chip.

The selection of a new password can be determined in accordance with different criteria, which may be particularly characteristic for a transponder technology, particularly an RFID tag technology. For instance, the number of modulations since the last POR ("power on reset", that is to say the time since activation of the data carrier), amplitude of the electromagnetic field provided by a base station, time duration since the tag has entered the field, etc.

Starting from a "seed", for instance the memory content, the password may be continuously modified in a pseudo-random manner, so that it is difficult or practically impossible for an attacking entity to recognize what the present password is. The reason for this is that the password is not fixed, so that methods like DPA are not appropriate to determine such a password.

One method of finding out a password is "brute force", that is to say trying to find the correct password by a simple trial and error approach. Another method of finding out a password is "DPA". According to DPA, it may be tried to find out the password by analysing the current consumption during reading out the password from the EEPROM or during comparing the password. Since the signals are usually very small, an averaging over many measurements is necessary. Due to these characteristics of common methods of finding out a password, embodiments of the invention continuously altering a password are appropriate to reduce the probability of success of such methods of finding out a password.

Thus, according to an exemplary embodiment, a portion of the memory or the entire memory may be made modifiable, wherein the access to such a memory portion for modifying the memory content is only permitted to an authorized entity knowing the password and providing the password as a part of a request message sent from the base station to the transponder.

Conventionally, when a base station sends a read or write request, the RFID tag checks whether the fixed password is correct, and only if this is the case the RFID tag allows the base station to access the memory to perform the desired operation. However, in contrast to such a conventional approach which may lack security due to the fixed password, exemplary embodiments of the invention do not fix the password in the RFID tag, but allow the password to be variable, particularly to be varied in a random manner. Therefore, methods like DPA do not work properly any longer, since the password is continuously modified.

In order to operate a reader/writer device in accordance with a transponder, the password updating scheme should be known both in the transponder and in the read/write device. Therefore, both entities may have the capability to derive unambiguously the actually valid password at each moment, so that a synchronization of the password update scheme is possible. For instance, after 100 ms, the password may be updated.

A logic/processor may have implemented an algorithm which modifies the password in accordance with a defined scheme. The reader/writer on the one hand and the transponder on the other hand should both know the password generation algorithm and should carry out the same measurements, for instance when the result of a measurement shall be taken as a basis for determining the password. This may require a synchronization.

In the following, further exemplary embodiments of the electric circuit will be explained. However, these embodiments also apply for the transponder, for the base station, for the method, for the program element and for the computer-readable medium.

The memory unit may be an alterable memory unit so that communication related information stored in the memory unit may be alterable. The term "communication related information" may particularly denote any information which may be stored in the memory unit like a serial number, other useful data, a present password, a historical password etc. By making particularly the password modifiable, the degree of security may be increased. Also, generated (pseudo-)random numbers which may be used for deriving an updated authentification code from a present one may be stored in the memory unit.

The memory unit may be adapted for storing at least one of the group consisting of the authentification code, useful data to be read by the base station, and useful data to be supplied by the base station.

The electric circuit may comprise a synchronization unit adapted for synchronizing the pseudo-random authentification code altering scheme to be performed in the electric circuit for the transponder and in the base station. Such a synchronization unit may allow to bring the scheme of updating the password in accordance in the reader/writer device and in the transponder.

The processor circuit may be adapted for applying the pseudo-random authentification code altering scheme in a manner that an altered authentification code is derivable unambiguously from an actual authentification code in accordance with a predetermined algorithm. Therefore, the pseudo-random authentification codes to be generated repeatedly may be unambiguously derivable with the knowledge of the calculation scheme or algorithm in combination with the present password. However, if such an algorithm is not known, it is almost impossible for an unauthorized entity to be permitted to access the memory.

The processor unit may be adapted for altering the authentification code triggered by at least one criteria of the group consisting of an expiry of a predetermined time interval (for instance 100 ms) after a previous alteration of the authentification code, an expiry of a predetermined time interval since a previous activation of the processor unit (for example a time period since the transponder has entered the electromagnetic field generated by the base station which field may be used by the transponder as an energy source), and an event determined by the processor unit (for instance an unauthorized and unsuccessful try of a possibly unauthorized entity to access the transponder). For instance, a new authentification code may be generated automatically when a certain time interval has expired, for instance 100 ms. Additionally, expiry of a predetermined time interval since a previous activation of the processor unit may be taken as a criteria. When a (passive) RFID tag approaches an environment of a reader/writer device, an electromagnetic field may be present which may allow the RFID tag to be activated or switched on, that is to say supplied with sufficient energy. From this instance of time, a time may be calculated after which the password shall be modified. Additionally or alternatively, specific events determined by the processor unit may trigger the modification of the password, for instance a request with an unsuccessful access to the memory, a request with a successful access of the memory, a reprogramming of information of the memory, etc.

The processor unit may be adapted for altering the authentification code by applying the pseudo-random authentification code altering scheme based on at least one criteria of the group consisting of a number of modulations since a previous activation of the processor unit, an amplitude of a present field strength, and a duration of a predetermined time interval since a previous activation of the processor unit. Such criteria may be directly related with the characteristics of the transponder, for instance of the RFID tag.

The processor unit may comprise at least one of the group consisting of a microprocessor unit and a logic unit.

The term "microprocessor unit" may denote an electronic chip with electronic components serving as a central processing unit (CPU). Such a circuit of transistors or other electrical components on a chip may progress programs, remember information, perform calculations, etc. Thus, a microprocessor may be an electronic circuit, usually on a single chip, which may perform arithmetic, logic and control operations.

The term "logic unit" may denote an entity (on an IC) capable for data manipulation and control functions in accordance with a specific logic, for example a Programmable Logic Device (PLD). It may comprise a programmable logic unit, like a Field-Programmable Gate Array (FPGA). An FPGA may be denoted as a specifically made digital semiconductor. An Application Specific Integrated Circuit (ASIC) may be denoted as a kind of integrated circuit, often referred to as "gate array" or as "standard cell" product, developed and designed to satisfy one customer specific application requirement.

The electric circuit may comprise a pseudo-random number generator adapted for generating pseudo-random numbers and to provide the generated pseudo-random numbers to the processor unit as a basis for the authentification code. For instance, the pseudo-random numbers may be generated by a separate entity, which provides the pseudo numbers to the processor unit and/or for storage to the memory unit. Such a pseudo-random number may be the password itself or it may form the basis for the deriving of a password.

The electric circuit may be adapted at least partially as a monolithically integrated circuit. For instance, it is possible that components like the memory unit and the processor unit may be manufactured in integrated circuit technology, for instance using semiconductor technology (for instance silicon technology). However, it is also possible to provide individual elements of the electric circuit conventionally wired.

In the following, further exemplary embodiments of the transponder will be explained. However, these embodiments also apply for the electric circuit, for the base station, for the method, for the program element and for the computer-readable medium.

The transponder may be a radio frequency identification tag (RFID) or a (for instance contactless) smartcard.

An RFID tag may comprise a semiconductor chip (having an integrated circuit) in which data may be programmed or rewritten, and a high frequency antenna matched to an operation frequency band used (for example 13.56 MHz). Besides the RFID tag, an RFID system may comprise a read/write device (i.e. a base station) and a system antenna enabling a bidirectional wireless data communication between the RFID tag and the read/write device. Use of a dipole antenna is possible. Additionally, an input/output device (for instance a computer) may be used to control the read/write device. Different types of RFID systems are distinguished, namely battery-assisted (supply by a battery, wherein a back modulation may be performed using load modulation (RF) or back scatter (microwaves)), active RFID systems (supply by a battery, wherein a back modulation may be performed actively) and passive RFID systems (supplied with energy via the RF field, wherein a back modulation may be performed using load modulation (RF) or back scatter (microwaves)). Moreover, semi-active (semi-passive) systems which are passively activated and in which a battery is used on demand (for instance for transmitting data) are available.

A smartcard or chipcard can be a tiny secure crypto processor embedded within a credit card-sized card or within an even smaller card, like a GSM card. A smartcard does usually not contain a battery, but power is supplied by a card reader/writer, that is to say by a read and/or write device for controlling the functionality of the smartcard by reading data from the smartcard or by writing data in the smartcard. A smartcard device is commonly used in the areas of finance, security access and transportation. Smartcards may contain high security processors that function as a security storage of data like cardholder data (for instance name, account numbers, a number of collected loyalty points). Access to these data may be made only possible when the card is inserted to a read/write terminal.

In the following, further exemplary embodiments of the base station will be explained. However, these embodiments also apply to the electric circuit, to the transponder, to the method, to the program element and to the computer-readable medium.

The base station may comprise a processor unit (for instance a CPU, central processing unit) adapted for altering an authentification code necessary for the base station to get access to the memory of the electric circuit of the transponder in accordance with the pseudo-random authentification code altering scheme which is also used by the processor unit of the electric circuit of the transponder. In other words, the processor unit of the base station and of the transponder may be adjusted to one another.

The base station may comprise a wireless communication unit comprising an antenna element. Therefore, the base station or communication partner device may be adapted for wireless communication with the transponder, wherein the antenna element may be a loop antenna or a dipole antenna.

The base station may be adapted as at least one of a reader device for reading data from the memory, a write device for writing data into the memory, and a reader/writer device for reading data from the memory and for writing data into the memory. Thus, the base station may be a base station for communication with a transponder like a smartcard or an RFID tag.

Also the base station may comprise a synchronization unit adapted for synchronizing the pseudo-random authentification code altering scheme to be performed in the base station and in the electric circuit for the transponder. Therefore, the synchronization units of the base station and of the transponder may form a system in which both entities know at each instance of time which password is presently valid.

Embodiments of the invention may be particularly applied in the service sector, in the field of logistics, in the field of commerce and in the field of industrial production. Further applications of identification systems are related to the identification of persons and animals.

In particular contactless identification systems are suitable for a wireless transmission using exemplary embodiments of the invention. Such systems use the emission and absorption of electromagnetic waves, particularly in the high frequency domain (for instance around 13.56 MHz). Systems having an operation frequency below approximately 800 MHz are frequently based on an inductive coupling of coils, which are brought in a resonance state by means of capacitors, and which are suitable for a communication across small distances of up to one meter. Particularly, the following frequencies may be used: 125 kHz, 13.56 MHz (inductively), ultra high frequency like 800 MHz, microwaves like 2.45 GHz (wave propagation).

The communication between different components of the device or between the device and further devices may be carried out in a wired manner (for instance using a cable) or in a wireless manner (for instance via a RF communication or infrared communication).

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
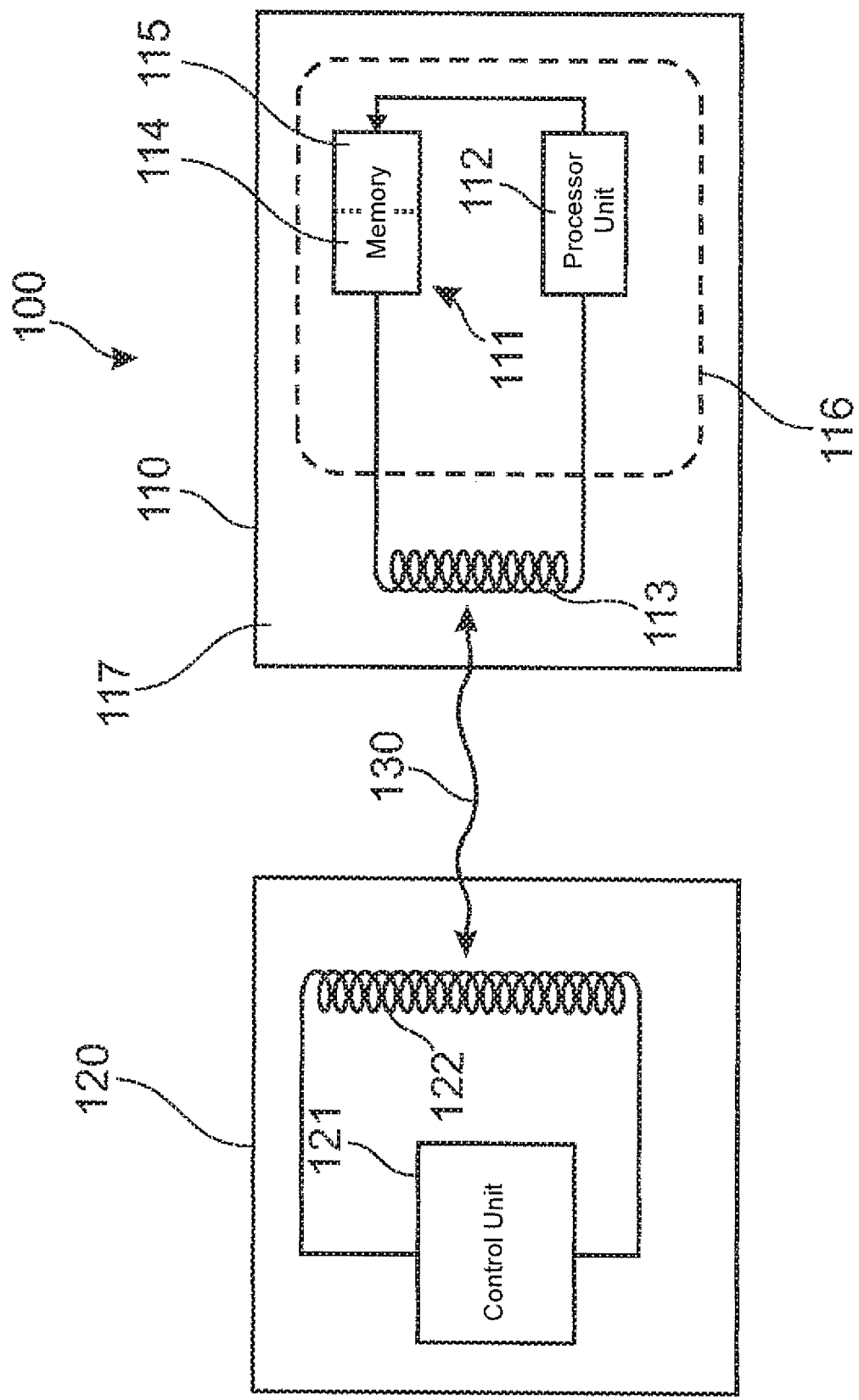
FIG. 1 shows a communication system according to an exemplary embodiment of the invention.

The illustration in the drawing is schematically. In different drawings, similar or identical elements are provided with the same reference signs.

In the following, referring to FIG. 1, a communication system 100 according to an exemplary embodiment of the invention will be explained.

The communication system 100 comprises an RFID tag 110 as a transponder and a read/write device 120 as a base station for communicating with the RFID tag 110.

As can be taken from FIG. 1, the RFID tag 110 comprises a monolithically integrated electric circuit 116 comprising a memory unit 111 adapted for storing data related to the communication between the RFID tag 110 and the base station 120. Furthermore, the electric circuit 116 comprises a microprocessor 112 adapted for altering—in accordance with a pseudo-random authentification code altering scheme—an authentification code necessary for the base station 120 to get access to the memory 111. In other words, the processor unit 112 is coupled to the memory 111 and may allow access of the read/write device 120 to the memory 111 for reading or writing only when a password provided with a request from the base station 120 accessing the RFID tag 110 includes the presently valid password.

However, the password is repeatedly modified by the processor unit 112 from time to time, for instance always after expiry of 100 ms. This password updating scheme may be synchronized with the password updating scheme in the base station 120 steered by a processor unit 121 of the base station 120.

For accessing the memory 111 of the RFID tag 110, the control unit 121 generates a request which is transmitted by a receiver/emitter antenna 122 of the base station 120. Consequently, electromagnetic waves 130 are exchanged between the entities 120, 110. More generally, the base station 120 generates an electromagnetic field in its environment which may supply an RFID tag 110 with a communication message accompanied by a password and with electric power.

A receiver antenna 113 of the RFID tag 110 absorbs the electromagnetic radiation 130, uses the latter for its power supply, and provides the request for accessing the memory 111 to the processor 112. The processor 112 compares the actually valid password with the password included in the communication message 130 and decides upon a result of this comparison whether the base station 120 shall be authorized to get access to the memory 111 or not. If the password is correct, the base station 120 may access the memory 111 of the RFID tag 110, for instance for reading, writing or locking further access to the memory 111. If the password is not correct, the processor unit 112 prevents the reader device 120 from accessing the memory 111.

The memory 111 is an alterable memory unit (for instance an SRAM, an FRAM, an EEPROM, a flash memory) so that the information stored in the memory 111 may be re-written. The memory unit 111 comprises a first portion 114 which may include useful data (for instance a serial number of the RFID tag 110 and/or a price of a product to which the RFID tag 110 is attached in a store) and comprises a second portion 115 in which, for instance, the actually present password is stored.

The processor unit 112 is adapted for executing the pseudo-random authentification code altering scheme in a manner that an altered authentification code is derived unambiguously from an actual authentification code in accordance with a predetermined algorithm. For instance, the algorithm may be to measure the intensity of the field 130 and take a particular digit (for instance the third digit) of the measured intensity as a basis for deriving a pseudo-random number. This pseudo-random number may then be used as a password. According to the described embodiment, this password is updated and recalculated after each expiry of 100 ms.

For instance, a password may be altered when the field strength is modified in a characteristic pattern (for example 3A/m-1Am-5A/m).

As can further be taken from FIG. 1, the memory 111 and the processor unit 112 are formed as an integrated circuit 116, wherein the rest of the RFID tag 110 is conventionally wired, particularly the antenna 113. All these components are provided on and/or in a substrate 117, for instance a plastic substrate.

The antenna 113 serves as a wireless communication unit which is electrically coupled to the integrated circuit 116 for communication with the base station 120.

Also the processor unit 121 of the base station 120 is adapted for altering the authentification code necessary for the base station 120 to get access to the memory 111 of the electric circuit of the transponder 110 in accordance with the pseudo-random authentification code altering scheme of the processor unit 112 of the electric circuit of the transponder 110.

The base station 120 comprises the wireless communication unit 122 for wirelessly communicating with the transponder 110. The wireless communication unit 122 may be a common receiver/emitter antenna, or two antenna, namely a separate emitter antenna and a separate receiver antenna. In the same manner, also the RFID tag 110 may have a common receiver/emitter antenna 113 or two separate antenna elements.

The base station 120 is a reader/writer device for reading data from the memory 111 and for writing data into the memory 111.

In the following, referring to FIG. 2, a block circuitry of a transponder 200 according to an exemplary embodiment of the invention will be explained.

The transponder 200 comprises an antenna 113 which can also be a dipole. The antenna 113 is coupled to a rectifier circuit 201 for rectifying an electric voltage induced in the antenna 113 in the presence of an electromagnetic field. The rectified voltage may be used for energy supply of the transponder 200, which is indicated by the supply voltage reference numeral $V_{dd}$. Furthermore, the signal as an output of the rectifier unit 201 may be provided to an Analog-to-Digital Converter 202 for digitalizing the analog signal provided there. An output of the ADC 202 is coupled to an input of a sequence control unit 203, for instance a microprocessor or a logic unit.

Furthermore, the antenna 113 is coupled to a clock recovery unit 204 generating an output signal which is also provided to the sequence steering unit 203. Instead of a clock recovery unit 204, it is also possible to use an internal oscillator.

Moreover, the signal detected by the antenna 113 is supplied to a demodulation unit 205 for demodulating the signal and providing a result of such a demodulation procedure to the sequence control unit 203.

The sequence steering unit 203 has a further input connected to a POR unit 217 (power on reset) which is supplied with the supply voltage $V_{dd}$.

The sequence steering unit 203 may also generate output signals which may be provided to a modulator unit 206.

Figure 2:
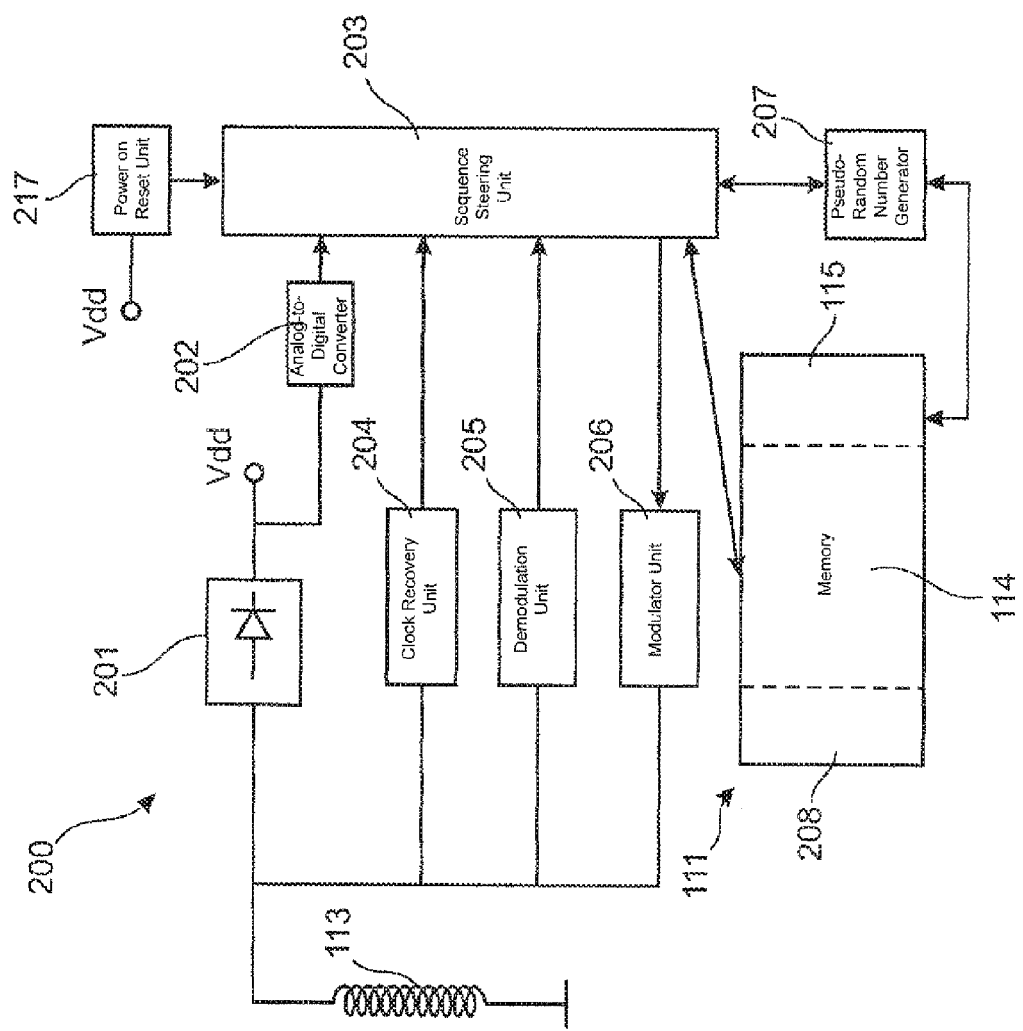
FIG. 2 shows a transponder according to an exemplary embodiment of the invention.

As can further be taken from FIG. 2, a pseudo-random number generator unit 207 is foreseen which generates pseudo-random numbers. These pseudo-random numbers are supplied to the sequence steering unit 203 and may be stored in a corresponding portion 115 of a memory unit 111. The memory unit 111 has a portion 114 for storing useful data or user data and has a portion 208 for storing a unique identifier (UID). The memory 111 is a read/write memory. The pseudo-random number generated by the pseudo-random number generating unit 207 and stored in a portion 208 of the memory unit 111 may serve as the password.

In the following, the functionality of the sequence steering 203 will be described in more detail. The sequence steering unit 203 essentially corresponds to the processor unit 112 of FIG. 1. The sequence steering unit 203 includes elements for counting the number of modulations. Additionally or alternatively, the time after POR may be measured. Additionally or alternatively, it is possible to evaluate amplitudes (at an output of the ADC 202). Any of these three (and/or other) information items, taken alone or in combination, may be used to generate, in dependence thereof, a pseudo-random number. Based on an actual pseudo-random number, the pseudo-random number generation unit 207 may generate a new pseudo-random number in accordance with an iterative calculation scheme.

The sequence steering unit 203 further comprises an element for comparing a stored password (for instance the previous pseudo-random number) with a received password and to initiate, based on the result of this comparison, an allowance to read instruction, an allowance to write instruction, or a lock instruction for locking a particular memory portion of the memory unit 111.

It should be noted that instead of a pseudo-random authentification code also a more simple generate-able authentification code may be applied, while still providing the repeatedly altering of said authentification code and achieving said advantages. Such altering may take place by reading a sequence of codes out of a list or by utilizing a formula with fixed parameters in order to derive the authentification code.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. An electric circuit for a transponder for communication with a base station, the electric circuit comprising a memory unit adapted for storing communication related information; a processor unit adapted for repeatedly altering an authentification code sufficient for the base station to get access to the memory in accordance with an authentification code altering scheme based on a measured characteristic of a transponder communication with the base station wherein the processor unit is adapted for altering the authentification code by applying the authentification code altering scheme being dependent on at least one parameter of the group consisting of a number of modulations of a communication signal since a previous activation of the processor unit, an amplitude of an actual field strength received from the base station, a duration of a predetermined time interval since a previous activation of the processor unit, or a combination of at least two of these parameters, such that the authentification code becomes a pseudo-random authentification code.

2. The electric circuit according to claim 1, adapted in such a manner that communication related information stored in the memory unit is alterable.

3. The electric circuit according to claim 1, wherein the memory unit adapted for storing at least one of the group consisting of the authentification code, useful data to be read by the base station, and useful data to be supplied by the base station.

4. The electric circuit according to claim 1, comprising a synchronization unit adapted for synchronizing the authentification code altering scheme to be performed in the electric circuit and in the base station.

5. The electric circuit according to claim 1, wherein the processor unit comprises at least one of the group consisting of a microprocessor unit and a logic unit.

6. The electric circuit according to claim 1, adapted at least partially as a monolithically integrated circuit.

7. The electric circuit according to claim 1, comprising a decryption unit adapted for decrypting an encrypted communication message received from the base station, the decryption being performed using a decryption scheme known by the electric circuit and by the base station so that the decrypted communication message comprises the authentification code.

8. A transponder for communication with a base station, the transponder comprising an electric circuit according to claim 1; a wireless communication unit electrically coupled to the electric circuit for wirelessly communicating with the base station.

9. The transponder of claim 8, adapted as one of the group consisting of a radio frequency identification tag and a contactless smartcard.

10. A base station, the base station being adapted for communicating with a transponder comprising an electric circuit according to claim 1.

11. The base station of claim 10, comprising a processor unit adapted for repeatedly estimating the authentification code necessary for the base station to get access to the memory of the electric circuit of the transponder in accordance with the authentification code altering scheme of the processor unit of the electric circuit of the transponder.

12. The base station of claim 10, comprising a wireless communication unit for wirelessly communicating with the transponder.

13. The base station of claim 10, adapted as at least one of the group consisting of a reader device for reading data from the memory, a write device for writing data in the memory, and a reader/writer device for selectively reading data from the memory and for writing data in the memory.

14. The base station of claim 10, comprising a synchronization unit adapted for synchronizing the pseudo-random authentification code altering scheme to be performed in the base station and in the electric circuit for the transponder.

15. A method of communicating between a transponder and a base station, the method comprising repeatedly altering an authentification code wherein the altered authentification code is dependent on at least one parameter of the group consisting of a number of modulations of a communication signal since a previous activation of a processor unit of the transponder, an amplitude of an actual field strength received from the base station, a duration of a predetermined time interval since a previous activation of the processor unit, or a combination of at least two of these parameters, such that the authentification code becomes a pseudo-random authentification code and wherein altering the authentification code is triggered by at least one of the group consisting of an expiry of a predetermined time interval since a previous activation of the transponder, and an expiry of a predetermined time interval since an unsuccessful attempt to access a memory of the transponder.

16. A non-transitory computer-readable storage medium, in which a computer program is stored which, when being executed by a processor, is adapted to control or carry out a method of claim 15.

* * * * *